(12) United States Patent
Choi

(10) Patent No.: US 8,407,739 B2
(45) Date of Patent: Mar. 26, 2013

(54) APPARATUS AND METHOD FOR DISPLAYING BROADCASTING PROGRAM GUIDE INFORMATION

(75) Inventor: Jin Man Choi, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 608 days.

(21) Appl. No.: 12/292,474

(22) Filed: Nov. 19, 2008

(65) Prior Publication Data

US 2009/0133066 A1    May 21, 2009

(30) Foreign Application Priority Data

Nov. 20, 2007  (KR) .................. 10-2007-0118702
Oct. 23, 2008  (KR) .................. 10-2008-0104417

(51) Int. Cl.
*H04N 5/445*    (2011.01)

(52) U.S. Cl. ....................................... 725/40

(58) Field of Classification Search .......... None
See application file for complete search history.

(56) References Cited

U.S. PATENT DOCUMENTS

| 6,392,709 | B1 * | 5/2002 | Orito ............................ 725/40 |
| 6,532,590 | B1 * | 3/2003 | Chimoto ...................... 725/43 |
| 6,577,350 | B1 * | 6/2003 | Proehl et al. ................. 725/39 |
| 6,857,128 | B1 * | 2/2005 | Borden et al. ............... 725/39 |
| 2007/0039021 | A1 | 2/2007 | Lee |
| 2007/0300256 | A1 * | 12/2007 | Coomer et al. ............... 725/44 |
| 2008/0060007 | A1 | 3/2008 | Matsubayashi et al. |
| 2012/0278840 | A1 * | 11/2012 | Glennon et al. ............... 725/56 |

FOREIGN PATENT DOCUMENTS

| JP | 2006-157395 | 6/2006 |
| KR | 10-2007-0018343 | 2/2007 |

* cited by examiner

*Primary Examiner* — Brian Pendleton
*Assistant Examiner* — Fernando Alcon
(74) *Attorney, Agent, or Firm* — McKenna Long & Aldridge LLP

(57) ABSTRACT

Provided are an apparatus and a method for displaying a broadcasting program guide information.
This application is for displaying the broadcasting program guide information by enlarging an area of a screen corresponding to a predetermined identifier or a blank area on the screen, and thereby outputting the program guide information.

19 Claims, 6 Drawing Sheets

600

APPARATUS AND METHOD FOR DISPLAYING BROADCASTING PROGRAM GUIDE INFORMATION

CROSS-REFERENCE TO RELATED APPLICATIONS

The present application claims priority under 35 U.S.C. 119 and 35 U.S.C. 365 to Korean Patent Applications No. 10-2007-0118702 filed on Nov. 20, 2007 and 10-2008-0104417 filed on Oct. 23, 2008, which are hereby incorporated by references in their entireties.

BACKGROUND

The present disclosure relates to a apparatus and a method for displaying broadcasting program guide information.

A typical digital television can display additional data in its screen besides voice/image information. Therefore, multimedia added services such as diverse real time information (e.g., information related to broadcasting programs, stocks, the foreign exchange rate, and a weather forecast) and internet contents become possible.

Multimedia broadcasting displays currently broadcasted TV programs and additional information on a TV screen simultaneously through multimedia forms including images, voices, and various data. Therefore, TV viewers can selectively watch information they want.

Especially, since an electronic program guide (EPG) is provided as a TV broadcasting program schedule in a TV information screen, TV viewers can conveniently select a program by a time interval, a channel, and a broadcasting station.

FIG. 1 is a view of a general EPG screen.

Referring to FIG. 1, program guide information includes channel information (also a broadcasting station) and broadcasting information (program title information broadcasting/to be broadcasted) based on air time, data, and time interval.

As shown in an EPG screen 100 of FIG. 1, various program guide information 101 broadcasted between 14:30 and 15:30 is displayed by a 30 min interval, and there are blank areas 107 and 109 (i.e., no contents) between a BBC TWO channel 103 and a BBC NEWS 24 channel 105.

SUMMARY

Embodiments provide an EPG screen where program guide information including all program titles is identified.

Embodiments provide an EPG screen set to display a predetermined identifier in a corresponding area or a blank area if the predetermined minimum information (e.g., at least one character) cannot be displayed in the corresponding area of the EPG screen.

Embodiments display program guide information with at least a corresponding area enlarged if a user command accesses a predetermined identifier or a blank area or is inputted in the identifier or the blank area.

In embodiments, when a user command is inputted or accesses the identifier or the blank area, a predetermined time interval is adjusted and according thereto, at least an identifier or a blank area is enlarged to display program guide information.

In embodiments, a predetermined time interval is adjusted less when a user command is inputted or accesses an identifier or a blank area, and corresponding thereto, at least the identifier or the blank area is enlarged to display a program title enlarged and the time interval adjusted less.

In one embodiment, a method for displaying program guide information includes: displaying the program guide information in each area of a program guide screen; displaying a predetermined identifier or a blank area in a corresponding area if the program guide information to be displayed cannot be displayed in the area because the program guide information is more than the predetermined number of characters or is less than a predetermined program time; executing the program guide screen; confirming whether the predetermined identifier or the blank area is displayed in an area of the program guide screen or not; and displaying the program guide information by expanding the identifier or the blank area in a time axis if a user command is inputted into or accesses the identifier or the blank area based on the confirmation result.

The program guide information may be displayed in each area of the EPG screen by a time interval including at least a minute and a channel/broadcasting station.

In another embodiment, a broadcasting apparatus for displaying program guide information includes: a tuning unit receiving a broadcasting signal; a decoding unit decoding a voice and image signal including program guide information by decoding the broadcasting signal received through the tuning unit; an input unit inputting user control information; a receiving unit receiving the user control information; a control unit configured to output program guide information by a broadcasting program or a channel, which is received from the decoding unit 206, based on predetermined screen configuration information, output the program guide information as a predetermined identifier or a blank area based on a determination result of whether the program guide information can be displayed in a corresponding area or not, and display the program guide information with the corresponding area enlarged if a user command is inputted into or accesses the identifier or the blank area; and an output unit outputting the program guide information.

The enlarging of the area may be automatically performed by adjusting a predetermined time interval to be less.

The details of one or more embodiments are set forth in the accompanying drawings and the description below. Other features will be apparent from the description and drawings, and from the claims.

DETAILED DESCRIPTION OF THE EMBODIMENTS

Hereinafter, an electronic program guide (EPG) method and apparatus according to an embodiment will be described with reference to the accompanying drawings.

First, an enlargement of an identifier or a blank area for displaying program guide information is executed by at least one of the followings.

1) only an area of a corresponding channel is enlarged. Additionally, a time interval area is subdivided and displayed corresponding to the enlarged area. An area can be enlarged corresponding to the subdivision of the time interval area (i.e., smaller than before).

2) an area is enlarged in at least one direction of the left or right with respect to an area of a corresponding channel. Accordingly, an adjacent area is shifted or overlapped by the enlarged area.

3) all areas of a corresponding channel are enlarged in the left or/and right direction.

4) all areas of all channels are enlarged. Additionally, time intervals of the all channels are subdivided and displayed in order to correspond to the enlarged area. All areas may be enlarged corresponding to the subdivision of the time interval area.

Figure 1:
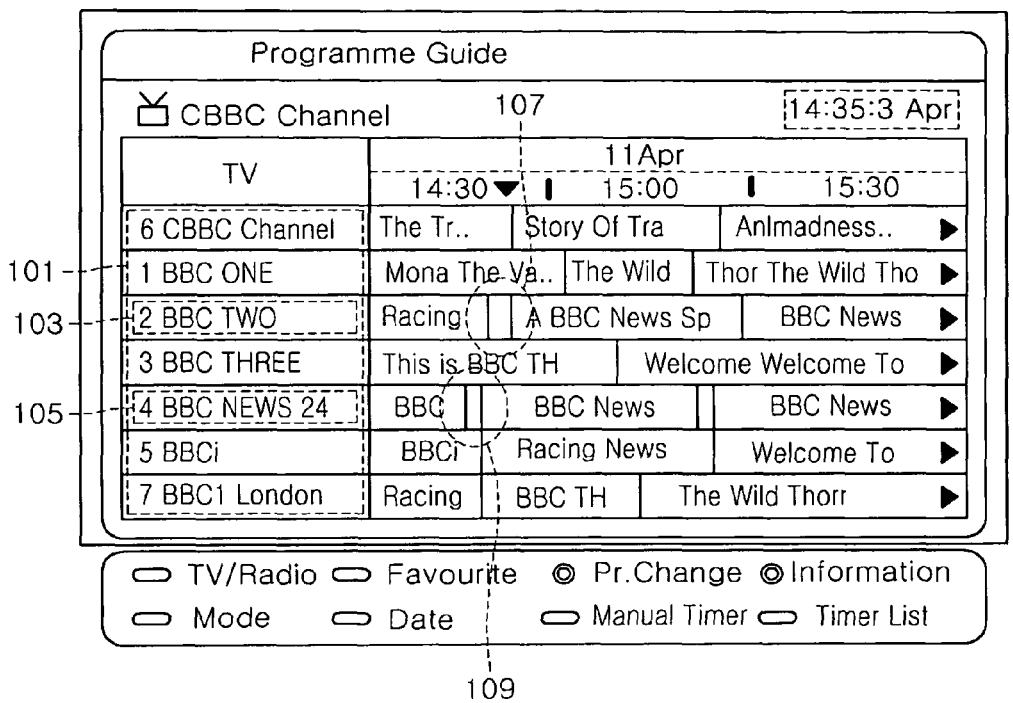
FIG. 1 is a view of a general EPG screen.
Figure 2:
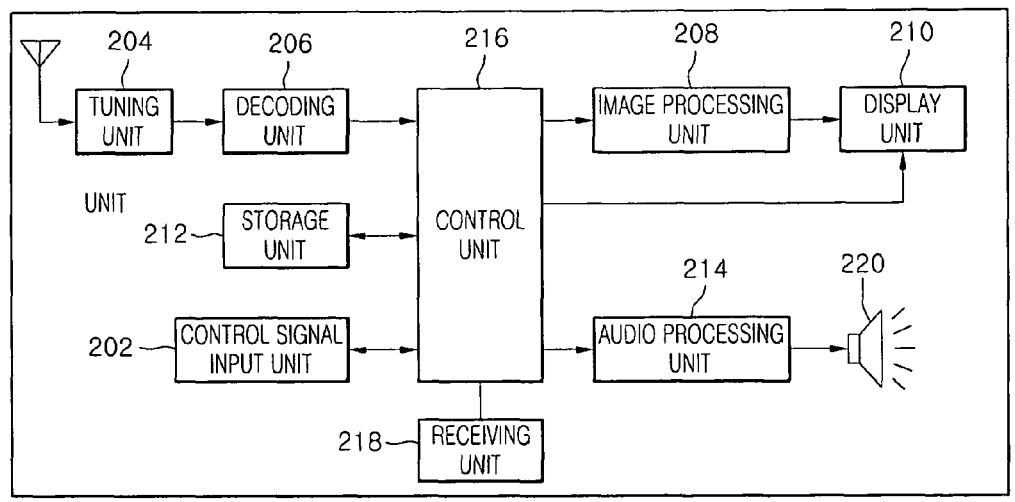
FIG. 2 is a block diagram illustrating components of a receiving apparatus for providing EPG according to an embodiment.

FIG. 2 is a block diagram illustrating components of a receiving apparatus for providing EPG according to an embodiment.

Referring to FIG. 2, the receiving device 200 includes a control signal input unit 202, a tuning unit 204, a decoding unit 206, an image processing unit 208, a display unit 210, a storage unit 212, an audio processing unit 214, a receiving unit 218, and a control unit 216. The receiving unit 218 receives a control signal from the external such as a remote control.

In more detail, the tuning unit 204 receives a broadcasting signal. The decoding unit 206 decodes a voice and image signal including program guide information by decoding the broadcasting signal received through the tuning unit 204. The input unit 202 inputs user control information. The receiving unit 218 receives the user control information through a remote control. The control unit 216 is configured to output program guide information by a broadcasting program or a channel, which is received from the decoding unit 206, based on predetermined screen configuration information, is configured to output the program guide information as a predetermined identifier or a blank area based on a determination result of whether the program guide information can be displayed in a corresponding area or not, and is configured to display the program guide information with the corresponding area enlarged if a user command is inputted into or accesses the identifier or the blank area. The output units 210 and 220 output the program guide information.

Based on the above configuration, the tuning unit 204 selects a broadcasting channel a user wants. The decoding unit 206 decodes a broadcasting signal inputted through the selected broadcasting channel. The image processor 208 scales an image signal, decoded in the decoding unit 206, and processed broadcasting information to be displayed on the display unit 210.

The display unit 210 displays the processed image and/or EPG information.

The storage unit 212 stores the received image or/and EPG information. The control signal input unit 202 receives a control signal from a local menu key attached to an image display device, i.e., a receiving device, or a remote control.

The control unit 216 controls a user command to select a broadcasting program with an identifier from the EPG information displayed in the display unit 210 according to the control signal inputted from the control signal input unit 202, and enlarges an area assigned to a corresponding program when the program with an identifier is selected to display program guide information. That is, the control unit 216 controls the Above-mentioned overall displaying operations.

Moreover, the control unit 216 detects that a cursor (i.e., a user indicator) as a user command moves to a program with an identifier and then automatically controls enlarging of an information displaying area if the corresponding cursor is on the program with an identifier.

Additionally, if the cursor moves to another broadcasting program again, the control unit 216 maintains the displayed area or controls restoring the originally displayed area size again.

While enlarging the corresponding area, an area allocated to a corresponding channel can be expanded by subdividing a broadcasting time shorter in an area allocated based on a broadcasting time, or regardless of the broadcasting time, an area assigned to a corresponding channel or all channels can be enlarged. Additionally, by expanding a corresponding area of a program having an identifier even in the same channel, the next program guide information can be shifted back or information about the program having an identifier can overlap the next program guide information.

FIGS. 3 to 8 are views illustrating an EPG screen that shows program guide information through enlargement of an area with an identifier based on various methods according to an embodiment.

Figure 3:
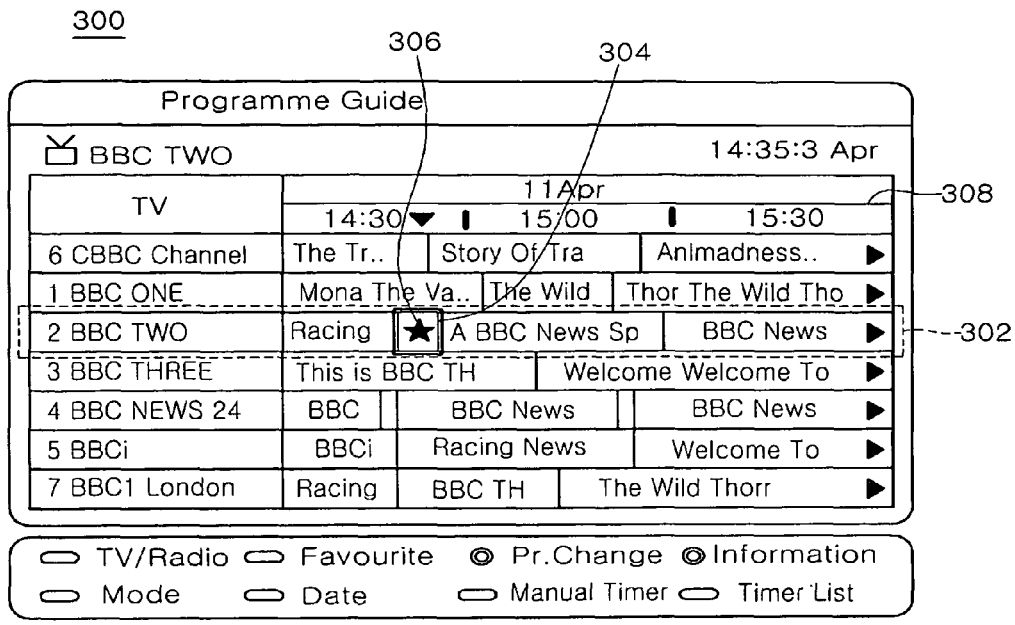
FIG. 3 is a view when an identifier 306 is displayed because program title information among program guide information cannot be displayed in an area 304.

FIG. 3 is a view when an identifier 306 is displayed because program title information among program guide information cannot be displayed in an area 304 of a specific time interval during a broadcasting time 308 of a specific channel 302 (e.g., BBC TWO).

Figure 4:
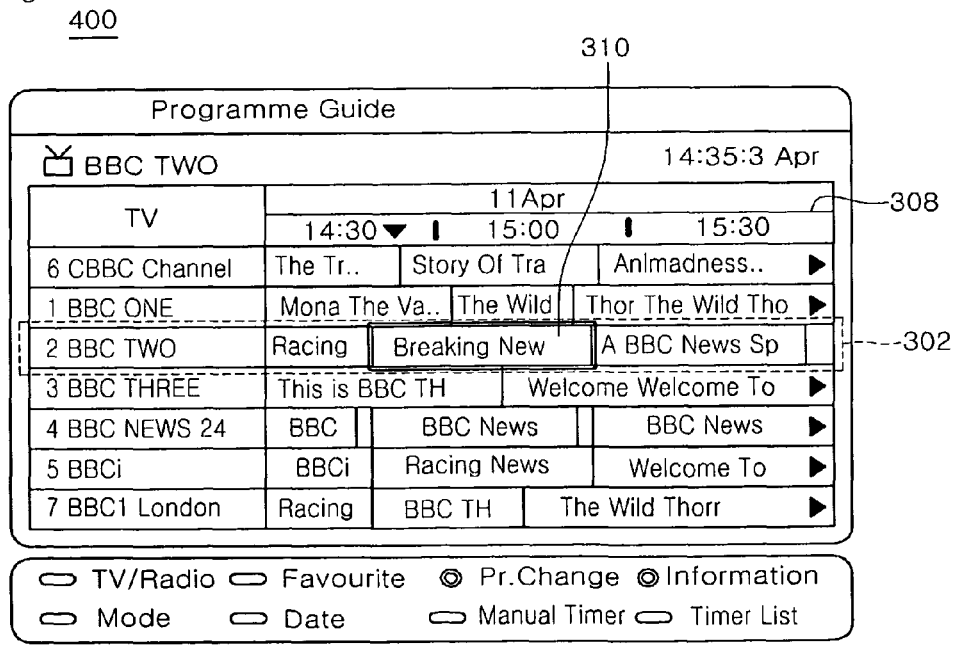
FIG. 4 is a view illustrating a corresponding enlarged area 310 of the area 302 of the channel 302 when a user command is inputted to or accesses the identifier 306 of FIG. 3.

FIG. 4 is a view illustrating a corresponding enlarged area 310 of the area 302 of the channel 302 when a user command is inputted to or accesses the identifier 306 of FIG. 3.

Figure 5:
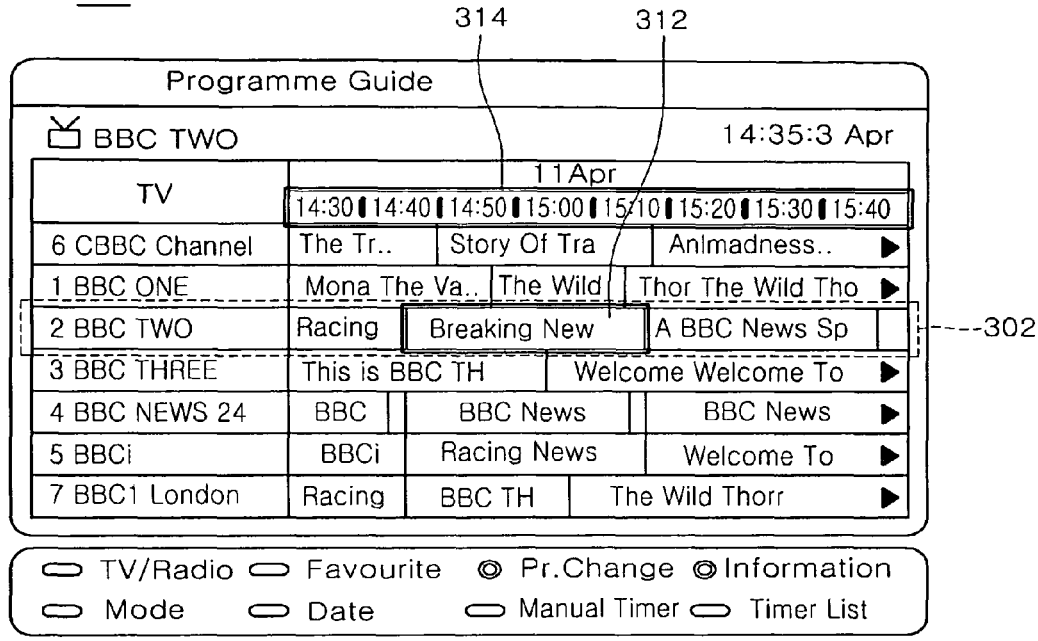
FIG. 5 is a view illustrating a case where an area 312 with the identifier of the channel 302 and areas of all other channels are enlarged when a user command is inputted to or accesses the identifier 306 of FIG. 3.

FIG. 5 is a view illustrating a case where a predetermined broadcasting time is subdivided (e.g., 30 min->10 min) and corresponding thereto, an area 312 with the identifier of the channel 302 and areas of all other channels are enlarged when a user command is inputted to or accesses the identifier 306 of FIG. 3.

Figure 6:
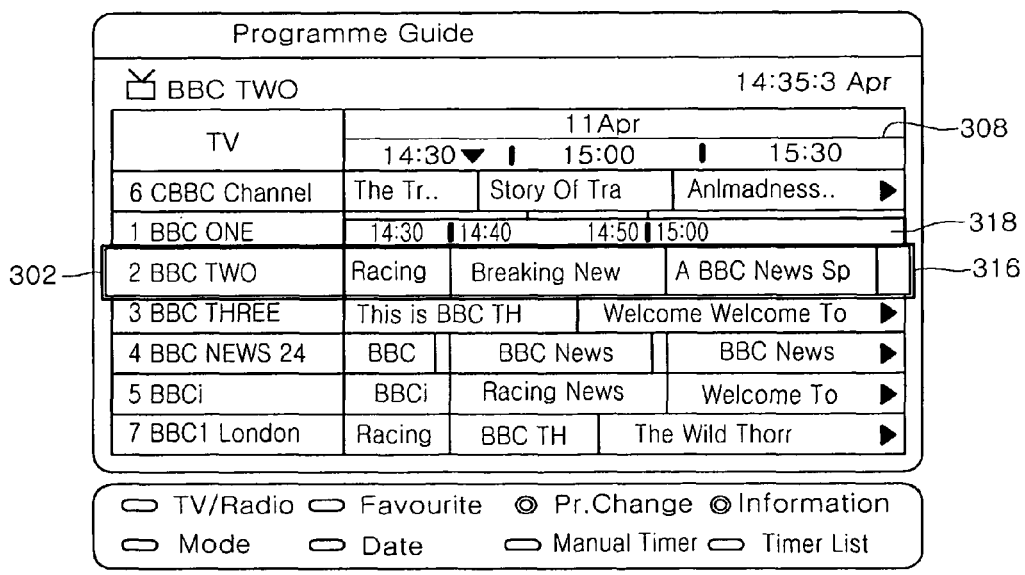
FIG. 6 is a view illustrating an area 316 where all areas of a corresponding channel 302 are enlarged when a user command is inputted to or accesses the identifier 306 of FIG. 3.

FIG. 6 is a view illustrating an area 316 where all areas of a corresponding channel 302 are enlarged when a user command is inputted to or accesses the identifier 306 of FIG. 3. Additionally, besides an existing broadcasting time 308, a subdivided time 318 is shown to correspond to the enlarged area 316. In all embodiments herein, a broadcasting time can be subdivided in order to correspond to an enlarged area, or an area can be enlarged in order to correspond to the subdivided time.

Figure 7:
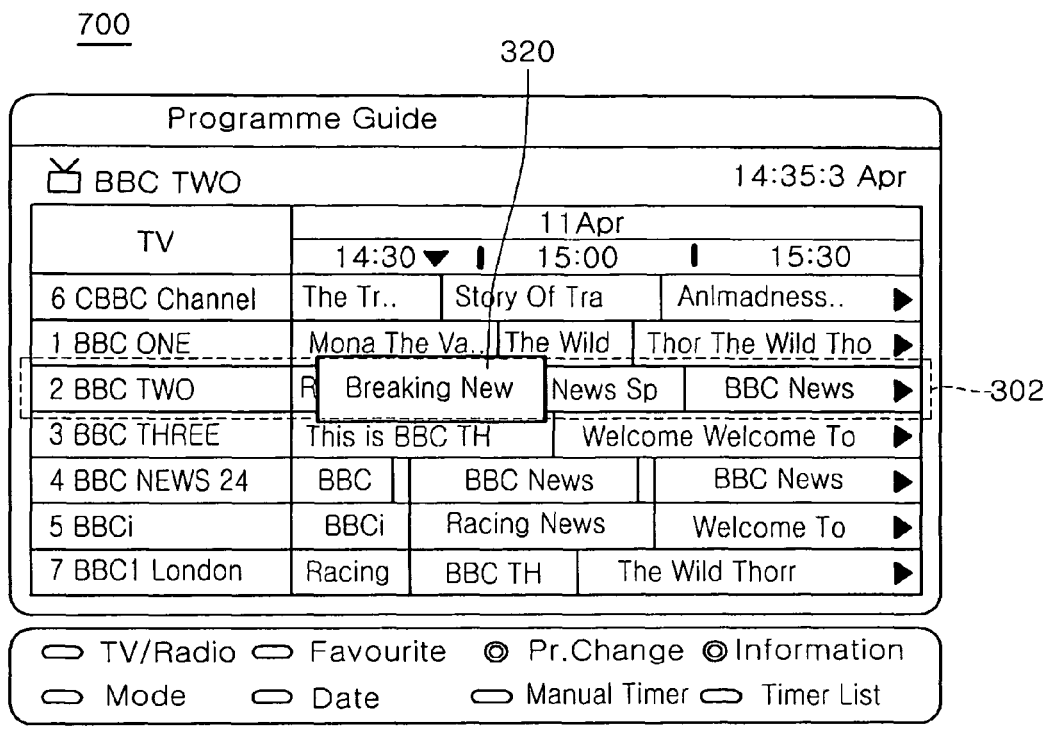
FIG. 7 illustrates a comparative embodiment with respect to FIG. 4 and also illustrates a case where only the area 304 of the corresponding channel 302 in FIG. 4 is enlarged to an area 320 overlapping another area when a user command is inputted to or accesses the identifier 306 of FIG. 3.

FIG. 7 illustrates a comparative embodiment with respect to FIG. 4 and also illustrates a case where only the area 304 of the corresponding channel 302 in FIG. 4 is enlarged to an area 320 overlapping another area when a user command is inputted to or accesses the identifier 306 of FIG. 3.

Figure 8:
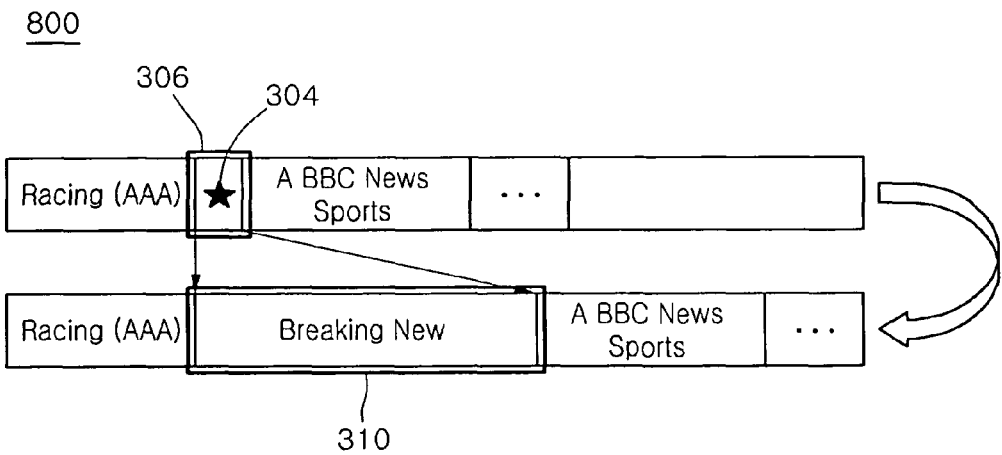
FIG. 8 is a view when FIG. 3 changes into FIG. 4 according to an embodiment.

FIG. 8 is a view when FIG. 3 changes into FIG. 4 according to an embodiment.

As shown in the drawings, only a program area 306 with an identifier 304 in a corresponding channel is enlarged such that program guide information is displayed in an enlarged area 310 and the next program guide information is shifted back.

Figure 9:
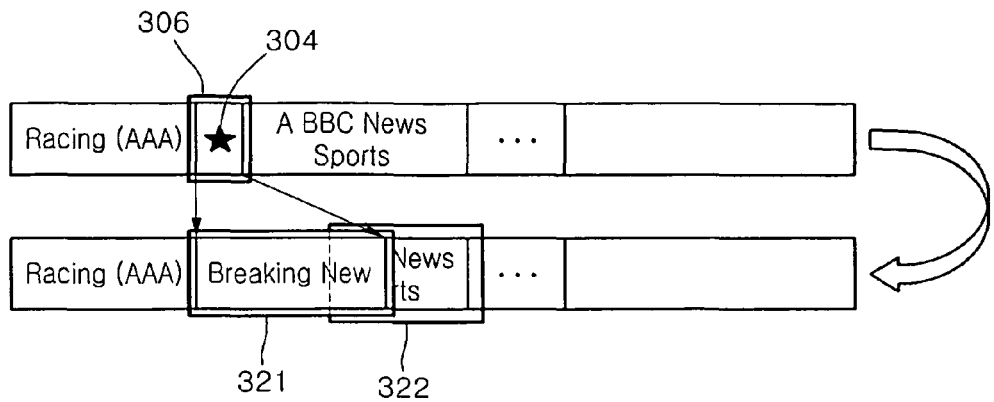
FIG. 9 illustrates case where program guide information is displayed while an enlarged area 321 overlaps an existing another area 322.

FIG. 9 illustrates a comparative embodiment with respect to FIG. 7 and also illustrates a case where program guide information is displayed while an enlarged area 321 overlaps an existing another area 322.

An embodiment of the present disclosure will be described with reference to the Above-mentioned drawings.

FIGS. 3 and 4 are views of an EPG screen where an identifier is displayed according to an embodiment.

First, enlargement of an area with an identifier or a blank area is executed only when a user selects or accesses a corresponding area.

The identifier is displayed only when a program title cannot be displayed and a user can set the number of characters to be displayed in advance. For example, if there is an area where one character cannot be displayed, the identifier (it is assumed that the identifier is less than one character) or a blank area will be displayed. Additionally, the dimension of the area is formed corresponding to the subdivided time interval.

Additionally, even when a program area is enlarged, it is restrictively enlarged in order to display a plurality of areas displaying program guide information of a corresponding channel. If there are three areas, the enlarged program area is positioned on the middle and other program areas are positioned on the left/right areas.

In this case, another area can be shifted back or an enlarged area can overlap another area according to various embodiments. Also, an enlarged area can be positioned on the left area and all other areas can be positioned on the right area.

Additionally, according to channel or broadcasting station classification mentioned in the present disclosure, if one broadcasting station broadcasts more than one channel, it will be displayed with channel/broadcasting station classification, but if not, it substantially has the same meaning.

Referring to FIG. 3, EPG screen information 300 includes at least one channel (i.e., 1 channel to 7 channel) and a broadcasting time 308 set by a 30 min interval.

That is, the broadcasting time 308 in a horizontal direction represents a time axis and in a vertical direction represents a channel axis.

If a BBC TWO 302 of a channel 2 is exemplified, there is an identifier having a symbol ★ instead of a program title having a short broadcasting time in an area next to a program title "Racing"

The symbol ★ is just one example, and is an identifier 306 representing that there is a certain program in a corresponding area.

If the identifier is displayed, it can be easily determined whether there is a certain program corresponding to that area or not in an initial EPG screen.

Referring to FIG. 4, a user moves a cursor (a kind of a user indicator) to the identifier 306 ★ in order to identify what kind of program exists in that area, the display area 304 of FIG. 3 allocated to a program having a short broadcasting time becomes a lengthened area 310.

That is, the corresponding area 304 expands in the time axis and displayed, and a broadcasting guide next to the corresponding area is shifted to the right.

Additionally, there is no display time change in the time axis, which is displayed by a 30 min interval.

If the area 304 is enlarged, ★ will disappear automatically, and the time bar, i.e., the allocated display area 310, will lengthens. Therefore, it will be identified that there is an actual program with a title "Breaking News".

FIG. 4 is a view illustrating a case where a change is applied to only a corresponding area of the BBC TWO 302 and there is no change in the broadcasting time 308.

If there is no change in the time axis in FIG. 4 or if a corresponding area expands in the time axis and is displayed, it is possible to allow a change to display an ending time of a corresponding program. That is, if a starting time of the "Breaking News" is 14:35 and its ending time is 14:45, the right end portion of the displayed "Breaking News" can display 14:45 in the time axis.

However, as illustrated in FIG. 5, if a broadcasting time interval is divided by 1 min, 5 min, and 10 min instead of 30 min like FIG. 4, according thereto, a display area of a corresponding program will be enlarged.

While enlarging an area, various embodiments are possible like the above. That is, it is possible that enlargement may be applied to only one channel, all channels, or all broadcasting time.

Figure 10:
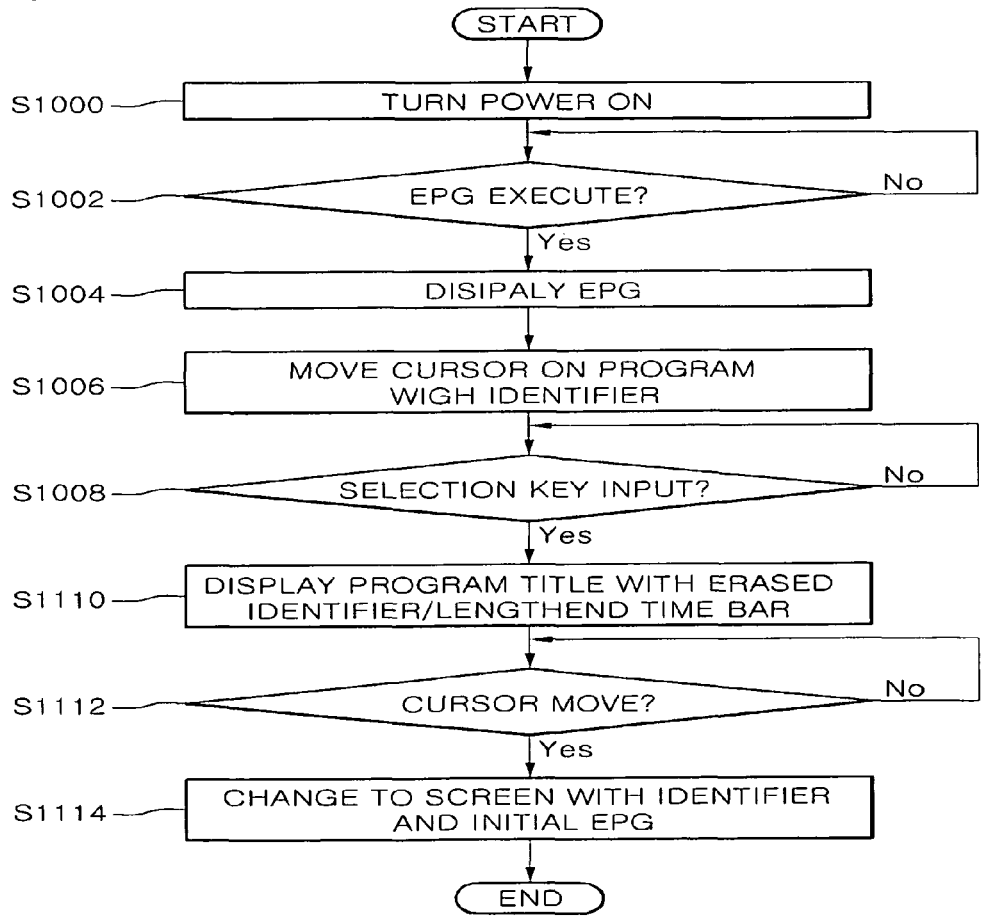
FIG. 10 is a flowchart illustrating a process of displaying program guide information having a short broadcasting time in an EPG screen.

FIG. 10 is a flowchart illustrating a process of displaying program guide information having a short broadcasting time in an EPG screen.

Referring to FIG. 10, once a power is inputted in the receiving device 200 in operation S1000, an EPG execution command is inputted to obtain broadcasting program guide information in operation S1002, and EPG information is displayed in a display screen like FIG. 3 in operation S1004.

A user identifies an identifier ★ which shows that there is an area where program guide information cannot be displayed in the EPG screen because of the program guide information has a short broadcasting time. Then, the user moves a cursor to identify the program guide information (e.g., a program title) of the corresponding area with the identifier ★ in operation S1006.

If the user moves the cursor on the area with the identifier ★ or inputs a select command to see corresponding program guide information in operation S1008, the identifier ★ automatically disappears and a time bar of an area allocated to the corresponding program becomes longer to display a program title in operation S1110.

In general, the length of the time bar is proportional to a predetermined time.

If the cursor positioned on the program moves on another program in operation S1112, the control unit displays the identifier ★ again on the area assigned to the program, and restores the original dimension of the area again in operation S1114.

On the other hand, unlike the above case where it is automatically restored to the original dimension, it can be restored to an original dimension only when the corresponding program is selected again and if not, it remains as it is.

Figure 11:
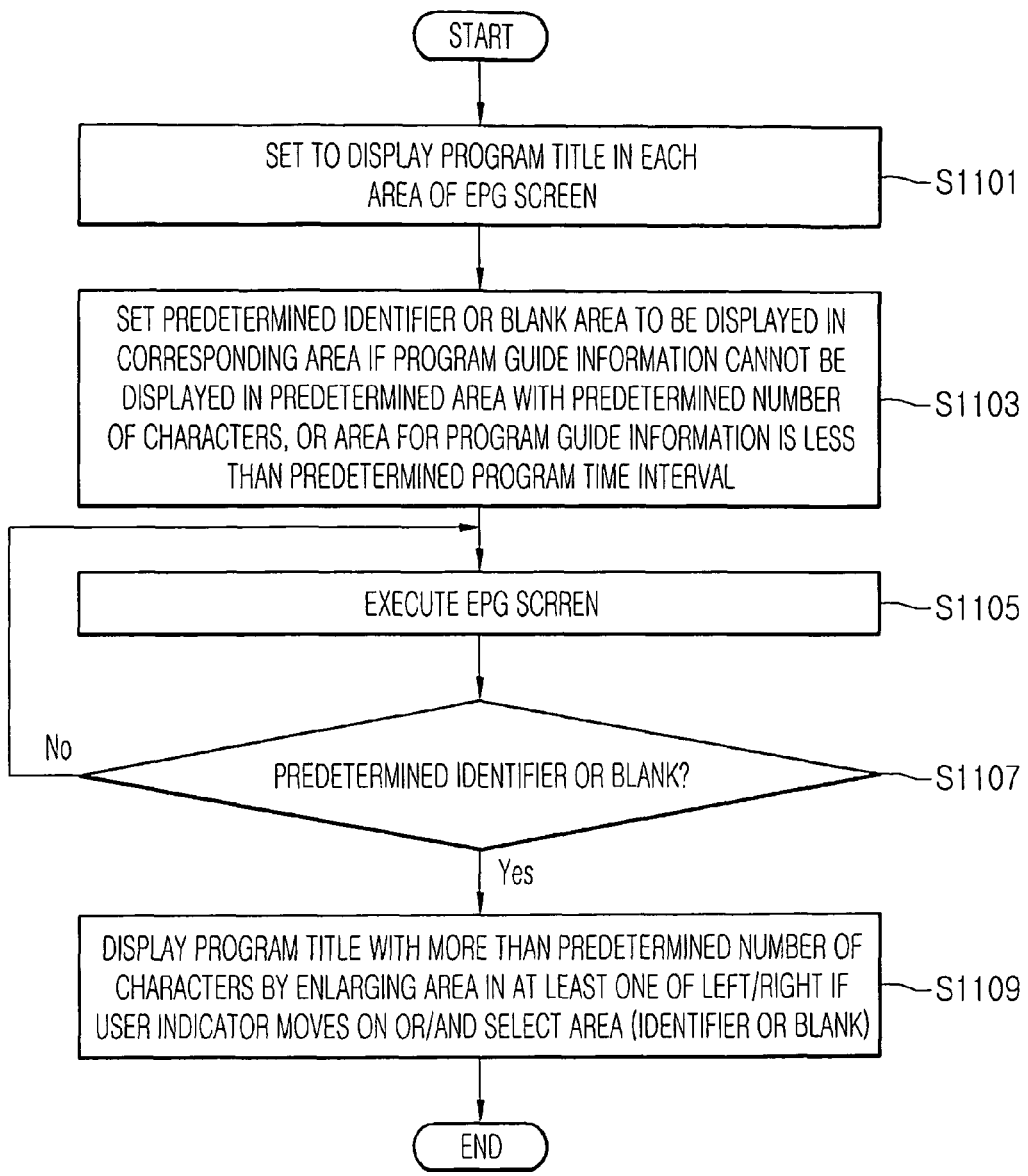
FIG. 11 is a flowchart illustrating when program guide information is displayed by enlarging an area where the program guide information cannot be displayed according to another embodiment.

FIG. 11 is a flowchart illustrating when program guide information is displayed by enlarging an area where the program guide information cannot be displayed according to another embodiment.

As shown in FIG. 11, an EPG screen is divided into a plurality of areas to display program guide information about channels in operation S1101. The dimension of each area set above can be determined by the sizes of programs outputting/ to be outputted (i.e., corresponding to a playing time in general) or can be determined by a data size. The control unit determines the size of the program according to the received and decoded data. Therefore, the control unit allocates an area dimension based on the program time. Of course, if there is no program time information, area dimension and display are changed based on user setting.

If program guide information cannot be displayed in a predetermined area with the predetermined number of characters (e.g., one character), or an area for program guide information is less than a predetermined program time interval, the predetermined identifier or a blank area is set to be displayed in a corresponding area in operation S1103.

A receiving device is turned on to execute an EPG screen in operation S1105.

If there is the identifier or blank area in the EPG screen in operation S1107, in a case where a user command is inputted into or accesses the corresponding area, the identifier or blank area is enlarged to display program guide information in operation S1109.

The above-mentioned various methods are applied to realize various enlargement embodiments.

All situations where a user command is inputted into or accesses the identifier or the blank area represents the same operation. The operation contains all operations for displaying program guide information in the identifier/blank area or all operations reflecting a user's intention.

As mentioned above, in order to display program guide information according to the present disclosure, program guide information including a program title is set to be displayed in each area of a program guide display, and a predetermined identifier or a blank area is set to be displayed in a corresponding area when program guide information to be displayed cannot be displayed because the information is larger than the predetermined number of characters (e.g., one character) or the program to be displayed is less than a predetermined time interval (e.g., less than 30 min). Then, a user executes the program guide screen.

At this point, based on a confirmation result about whether the predetermined identifier or the blank area is displayed in a program guide screen, if a user command is inputted to the identifier or the blank area (including a case where a user command accesses the identifier or the blank area), the area is enlarged to display program guide information through the device and method of the present disclosure.

Accordingly, while displaying an EPG screen, when a predetermined broadcasting time needs to be set longer (e.g., more than 30 min) in order to display broadcasting program guide information in one screen, a user can identify whether there is a program or not by assigning a position identifier to program guide information having a short broadcasting program time(less than 5 min, 10 min, and 30 min). Additionally, if a user command is directly/indirectly inputted in a corresponding area position, an EPG screen can easily display short broadcasting program guide information by expanding an area allocated to the corresponding program in order to easily identify detailed information.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A controller implemented method in a receiving apparatus for providing program guide information, the receiving apparatus configured to perform a method comprising:
    causing a predetermined identifier or a blank area in a corresponding area of a program guide screen to be generated if the program guide information to be displayed cannot be displayed in the corresponding area because the program guide information is more than the predetermined number of characters or is less than a predetermined program time allowed for the corresponding area; and
    causing an area corresponding to the identifier or the blank area to enlarge in order to provide the program guide information in that area if a user input associated with the identifier or the blank area is received,
    wherein if the user input associated with the identifier or the blank area is received, enlarging all areas of only a corresponding channel including at least the identifier or the blank area among all channel, and adjusting a time interval to correspond with the enlarged areas of only the corresponding channel; and
    wherein the time interval is subdivided and displayed in a time axis corresponding to at least one of the enlarged areas, and the subdivided time interval is smaller than a predetermined time interval before the adjusted time interval.

2. The method according to claim 1, wherein if the user input associated with the identifier or the blank area is received, enlarging the corresponding area in at least one direction to a left or right area of a corresponding channel in order to display the program guide information in the corresponding area.

3. The method according to claim 2, further comprising restrictively enlarging the area so that the program guide information can be displayed with at least a plurality of other program guide information that can be displayed within the program guide screen.

4. The method according to claim 3, wherein when two other program guide information among the other plurality of program guide information can be displayed in two areas of the channel, causing the enlarged area in which the program guide information corresponding to the identifier or the blank area to be displayed to be located in the middle area.

5. The method according to claim 4, further comprises causing the middle area to be restrictively enlarged so that other program guide information at the left or right area can be displayed.

6. The method according to claim 1, wherein the program guide information is displayed by enlarging the area corresponding to the identifier or the blank area in a time axis.

7. The method according to claim 1, all the area of only a corresponding channel including the identifier or the blank area among all channel is only enlarged in a time axis.

8. The method according to claim 1, wherein the predetermined time interval is adjusted less when the user input is received or accesses the identifier or the blank area, and corresponding thereto, at least the identifier or the blank area is enlarged to display a program title enlarged and the time interval adjusted less.

9. The method according to claim 1, while enlarging the corresponding area, all the area allocated to a corresponding channel is expanded by subdividing a broadcasting time shorter in an area allocated based on a broadcasting time.

10. The method according to claim 9, the broadcasting time is subdivided in order to correspond to the enlarged area.

11. The method according to claim 9, the area is enlarged in order to correspond to the subdivided time.

12. The method according to claim 1, when a program area for the program guide information among the a plurality of areas is enlarged, it is restrictively enlarged in order to display at least two areas displaying program guide information of a corresponding channel.

13. The method according to claim 12, if there are three areas, the enlarged program area is positioned on the middle and other program areas are positioned on the left/right areas.

14. The method according to claim 1, if the user input positioned on the program corresponding the identifier moves on another program, the control unit displays the identifier again on the area assigned to the program, and restores the original dimension of the area again.

15. A broadcasting apparatus for displaying program guide information, the apparatus comprising:
a tuner to receive a broadcasting signal;
a decoder to decode a voice and image signal including program guide information from the broadcasting signal received through the tuner;
a receiver to receive a user input information; and
a controller configured to process program guide information based on predetermined screen configuration information that includes a predetermined identifier or a blank area based on a determination result of whether the program guide information can be displayed in an allocated area or not, and an area corresponding to the identifier or the blank area that can be enlarged to display the program guide information when the receiver receives the user input information,
wherein the controller is configured to enlarge all areas of only a corresponding channel including at least the identifier or the blank area among all channel, and adjust a time interval to correspond with the enlarged areas of only the corresponding channel; and
wherein the time interval is subdivided and displayed in a time axis corresponding to at least one of the enlarged areas, and the subdivided time interval is smaller than a predetermined time interval before the adjusted time interval.

16. The broadcasting apparatus according to claim 15, wherein when the receiver receives the user input information associated with the identifier or blank area, the controller is configured to enlarge the corresponding area in at least one direction to a left or right area of a corresponding channel in order to display the program guide information in the corresponding area.

17. The broadcasting apparatus according to claim 16, wherein the controller is configured to restrictively enlarge the area so that the program guide information can be displayed with at least a plurality of other program guide information that can be displayed within the program guide screen.

18. The broadcast apparatus according to claim 15, wherein when the receiver receives user input information associated with the identifier or the blank area, the controller is configured to enlarge an area associated the identifier or the blank area so that program guide information can be displayed along with a time interval suitable for the enlarged area.

19. The broadcasting apparatus according to claim 15, wherein the program guide information is displayed by enlarging the area corresponding to the identifier or the blank area in a time axis.

* * * * *